(No Model.)

H. S. BREWINGTON.
FRYING PAN.

No. 433,231. Patented July 29, 1890.

WITNESSES:
Otto H. Ehlers
John E. Morris.

INVENTOR:
H. S. Brewington
BY Chas. B. Mann
ATTORNEY.

UNITED STATES PATENT OFFICE.

HENRY S. BREWINGTON, OF BALTIMORE, MARYLAND, ASSIGNOR TO BREWINGTON, BAINBRIDGE & CO., OF SAME PLACE.

FRYING-PAN.

SPECIFICATION forming part of Letters Patent No. 433,231, dated July 29, 1890.

Application filed March 11, 1890. Serial No. 343,497. (No model.)

*To all whom it may concern:*

Be it known that I, HENRY S. BREWINGTON, a citizen of the United States, residing at Baltimore, in the State of Maryland, have invented certain new and useful Improvements in Frying-Pans, of which the following is a specification.

This invention relates to an improvement in frying-pans; and its object is to provide an improved construction, whereby to allow the fumes and smoke arising from cooking to pass from the pan directly through the stove and into the chimney.

Figure 1:
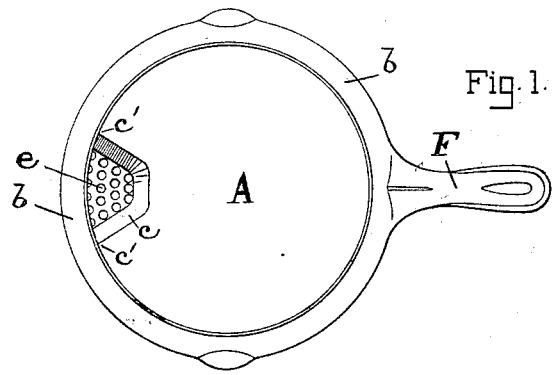
Figure 2:
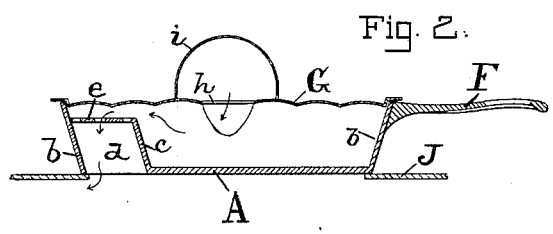
Figure 3:
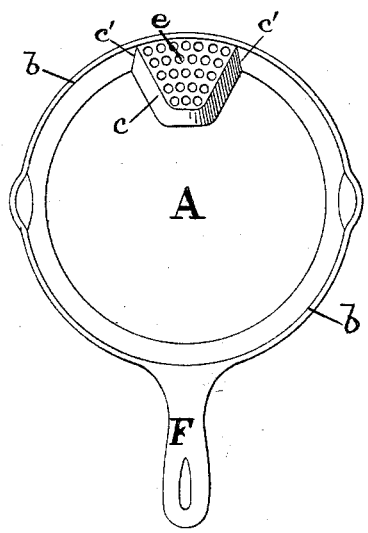
Figure 4:
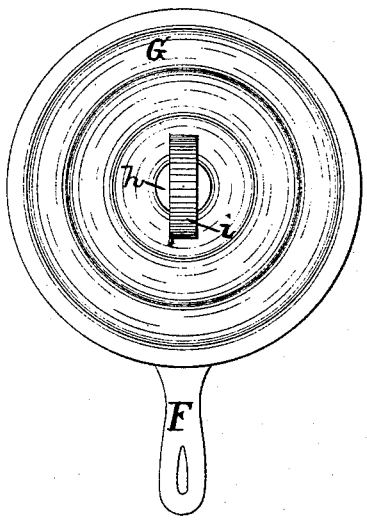

In the accompanying drawings, Figure 1 is a bottom view of the frying-pan having my improvement. Fig. 2 is a vertical section of the pan and cover. Fig. 3 is a top view of the pan with the cover removed. Fig. 4 is a top view of the pan with the cover in position.

The letter A designates the bottom of the frying-pan, and $b$ the circular wall, like ordinary vessels of this character. A portion of the bottom does not attach directly to the wall $b$, but attaches to a curb $c$, which connects directly with the wall at two points $c'$ and projects inward therefrom. Thereby an open space or recess $d$ is formed on the exterior side of the bottom. The curb $c$ within the wall $b$ is not as high as the wall; but, on the contrary, the top of the curb is below the top rim of the wall, for a purpose hereinafter named. A perforated plate $e$ is on top of the curb $c$, and the top surface of this perforated plate is on a plane below the top rim of the wall. The pan has an ordinary handle F. All these parts are made to constitute one casting.

A removable cover G has a horizontal flange which rests on the top of the wall of the pan, and also has a depression adjoining the said flange which sets down inside of the wall. As will be seen, the purpose of this depression is to keep the cover in place on the pan. The cover is also provided with a central air-inlet $h$ and a handle $i$. The advantage of having this air-inlet $h$ in the center is that the air-inlet will always be in the same relative postion with respect to the perforated plate $e$.

The operation of this device depends upon the creation of a current of air over that which is being cooked, which current is formed by the draft of the chimney—that is, the draft in the chimney causes a current of air to pass from the cook-room through the air-inlet $h$ in the cover G, thence under the cover across that which is being cooked and through the perforated plate $e$ on the curb-top, and down the recess $d$ to the stove J, from which it passes to the chimney, carrying with it the fumes and smoke from the pan. The course of the said current of air may be readily seen by the darts shown in Fig. 2.

It will be seen that the cover G, resting on top of the circular wall $b$ of the pan, does not close the perforated plate $e$ on the curb $c$, because said perforated plate is not as high as the wall, and a space above the curb is thereby left for the air-current. The curb and perforated plate being at the side leave the bottom unobstructed for meat or other food to lie on.

Having described my invention, I claim—

1. A frying-pan the interior of which is provided with a curb of a less height than the wall of the pan and joined thereto at its ends, a flat perforated plate joining the top of the curb with the wall below the top of the pan, and above the bottom, the bottom of the pan being joined to the lower edge of the curb, whereby an open space or recess is formed between the bottom of the pan and the wall at that point, substantially as described.

2. The combination, with a frying-pan having an open space or recess formed between its bottom and wall at one point and a curb and a perforated plate joining the top of the curb and the wall above the recess and below the bottom of the pan, of a lid or cover for the pan having a flange near its outer edge to fit within the top of the pan and having a central opening or hole and a flat handle over the opening, substantially as described.

In testimony whereof I affix my signature in the presence of two witnesses.

HENRY S. BREWINGTON.

Witnesses:
JOHN E. MORRIS,
JNO. T. MADDOX.